(12) United States Patent
Chen et al.

(10) Patent No.: US 10,218,601 B2
(45) Date of Patent: Feb. 26, 2019

(54) METHOD, SYSTEM, AND COMPUTER PROGRAM PRODUCT FOR CONFIGURING AN ATTRIBUTE FOR PROPAGATING MANAGEMENT DATAGRAMS IN A SWITCHLESS NETWORK

(71) Applicant: International Business Machines Corporation, Armonk, NY (US)

(72) Inventors: Lior Chen, Jerusalem (IL); Gregory Etelson, Rehovot (IL); Constantine Gavrilov, Rishon-le-Zion (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/131,817

(22) Filed: Apr. 18, 2016

(65) Prior Publication Data

US 2017/0302564 A1    Oct. 19, 2017

(51) Int. Cl.
*H04L 12/721* (2013.01)
*H04L 12/733* (2013.01)

(52) U.S. Cl.
CPC .......... *H04L 45/124* (2013.01); *H04L 45/122* (2013.01)

(58) Field of Classification Search
CPC ........................... H04L 45/124; H04L 45/122
See application file for complete search history.

(56) References Cited

U.S. PATENT DOCUMENTS

| | | | |
|---|---|---|---|
| 6,154,449 A | 11/2000 | Rhodes et al. | |
| 6,516,000 B1 | 2/2003 | Kshirsagar et al. | |
| 7,468,982 B2 | 12/2008 | Mehra et al. | |
| 7,580,359 B2 | 8/2009 | Pirbhai | |
| 8,228,913 B2 | 7/2012 | Block et al. | |
| 8,451,860 B2 | 5/2013 | Kinstler | |
| 9,124,383 B1 | 9/2015 | Frankel et al. | |
| 9,344,346 B2 | 5/2016 | Geib et al. | |
| 9,748,691 B2 | 8/2017 | Soubh et al. | |
| 2002/0018467 A1 | 2/2002 | Rajan | |
| 2003/0120852 A1 | 6/2003 | McConnell et al. | |
| 2004/0004963 A1 | 1/2004 | Mehra et al. | |
| 2004/0049663 A1 | 3/2004 | Hansen et al. | |
| 2004/0156322 A1 | 8/2004 | Mehra | |
| 2005/0204026 A1 | 9/2005 | Hoerl | |
| 2008/0109526 A1 | 5/2008 | Subramanian et al. | |
| 2008/0123552 A1 | 5/2008 | Slaton | |

(Continued)

OTHER PUBLICATIONS

Anonymous, "Method to Balance Interprocess High Performance Communication", dated 2014, An IP.com Prior Art Database Technical Disclosure, Total 4 pages.

(Continued)

*Primary Examiner* — Walter J Divito
(74) *Attorney, Agent, or Firm* — Rabindranath Dutta; Konrad, Raynes, Davda and Victor LLP

(57) ABSTRACT

A plurality of nodes are maintained in a switchless network, wherein each of the plurality of nodes has at least one host channel adapter for communication. A management datagram that indicates source to destination routes for communication in the plurality of nodes is provided. An attribute is configured in the management datagram to allow the management datagram to be propagated among the plurality of nodes of the switchless network without being terminated at host channel adapters.

20 Claims, 8 Drawing Sheets

(56) References Cited

U.S. PATENT DOCUMENTS

| | | | |
|---|---|---|---|
| 2008/0126509 | A1 | 5/2008 | Subramanian et al. |
| 2008/0279110 | A1 | 11/2008 | Hart et al. |
| 2010/0082853 | A1 | 4/2010 | Block et al. |
| 2012/0195431 | A1* | 8/2012 | Garcia Morchon .. H04W 12/04 380/270 |
| 2013/0054947 | A1 | 2/2013 | Gavrilov |
| 2013/0315098 | A1* | 11/2013 | Bombacino ........... H04W 48/08 370/254 |
| 2013/0343204 | A1 | 12/2013 | Geib et al. |
| 2015/0295756 | A1 | 10/2015 | Yin et al. |
| 2015/0338909 | A1* | 11/2015 | Woodruff .............. G06F 1/3209 713/323 |
| 2015/0350057 | A1 | 12/2015 | Huang et al. |

OTHER PUBLICATIONS

"InfiniBandTM Architecture Specification", dated Mar. 3, 2015, vol. 1 Release 1.3, InfiniBandSM Trade Association, Total 1842 pages.

Li et al., "Power Shifting in Thrifty Interconnection Network", dated 2011, Total 12 pages.

Lists of Related Applications, pp. 2, dated Apr. 18, 2016.

U.S. Appl. No. 15/131,822, filed Apr. 18, 2016, invented by Lior Chen et al., Total 38 pages.

U.S. Appl. No. 15/131,828, filed Apr. 18, 2016, invented by Lior Chen et al., Total 38 pages.

U.S. Appl. No. 15/131,834, filed Apr. 18, 2016, invented by Lior Chen et al., Total 34 pages.

Supplemental Amendment with appended Terminal Disclaimer, dated Mar. 23, 2018, for U.S. Appl. No. 15/131,822, filed Apr. 18, 2016, invented by Lior Chen, Total 10 pages.

Office Action, dated Nov. 17, 2017, for U.S. Appl. No. 15/131,822, filed Apr. 18, 2016, invented by Lior Chen, Total 20pages.

Office Action, dated Oct. 20, 2017, for U.S. Appl. No. 15/131,828, filed Apr. 18, 2016, invented by Lior Chen, Total 15 pages.

Response to Office Action, dated Feb. 20, 2018, for U.S. Appl. No. 15/131,822, filed Apr. 18, 2016, invented by Lior Chen, Total 10 pages.

Response to Office Action, dated Feb. 20, 2018, for U.S. Appl. No. 15/131,828, filed Apr. 18, 2016, invented by Lior Chen, Total 10 pages.

Notice of Allowance, dated Apr. 11, 2018, for U.S. Appl. No. 15/131,822, filed Apr. 18, 2016, invented by Lior Chen, Total 20 pages.

Notice of Allowance, dated Apr. 25, 2018, for U.S. Appl. No. 15/131,828 , filed Apr. 18, 2016, invented by Lior Chen, Total 17 pages.

Notice of Allowance, dated Apr. 24, 2018, for U.S. Appl. No. 15/131,834, filed Apr. 18, 2016, invented by Lior Chen, Total 30 pages.

Notice of Allowance, dated Oct. 18, 2018, for U.S. Appl. No. 15/131,822, filed Apr. 18, 2016, invented by Lior Chen, Total 16 pages.

Notice of Allowance, dated Oct. 24, 2018, for U.S. Appl. No. 15/131,828, filed Apr. 18, 2016, invented by Lior Chen, Total 10 pages.

* cited by examiner

METHOD, SYSTEM, AND COMPUTER PROGRAM PRODUCT FOR CONFIGURING AN ATTRIBUTE FOR PROPAGATING MANAGEMENT DATAGRAMS IN A SWITCHLESS NETWORK

BACKGROUND

1. Field

Embodiments relate to a method, system, and computer program product for configuring an attribute for propagating management datagrams in a switchless network.

2. Background

In a computer network a plurality of devices may communicate with a plurality of other devices. In many situations the devices are interconnected via a plurality of switches, where a switch is a computer networking device that connects the plurality of devices together in a computer network, by using packet switching to receive, process and forward data from a source device to the destination device via zero or more intermediate devices. Therefore, the switches may logically configure communication links between the plurality of devices with physical links being located between the switch and each device. Such a network that uses switches may be referred to as a switched computer network.

In contrast, in switchless computer networks, the plurality of devices are connected via dedicated links that do not includes switches. A device may receive a packet from one device and forward the packet to another device. As a result, a source device may be able to communicate with a destination device in switchless computer networks via one or more intermediate devices.

A subnet is a logical, visible subdivision of an Internet Protocol (IP) network. The practice of dividing a network into two or more networks is called subnetting. Computers, devices, and/or nodes that belong to a subnet are addressed via a common, identical, most-significant bit-group in their IP address. In a packet switched network (e.g., an IP network), a datagram is a basic data transfer unit. A datagram may be a self-contained, independent entity of data carrying sufficient information to be routed from the source to the destination computer without reliance on earlier exchanges between the source and the destination computer and the transporting network. The delivery, arrival time, and order of arrival does may not have to be guaranteed by the packet switched network.

InfiniBand* is a computer-networking communications standard that may be used in a computer network for communication among a plurality of devices. Further details of InfiniBand may be found in the publication "InfiniBand Architecture, Specification Volume 1, Release 1.3", published Mar. 3, 2015 by the InfiniBand Trade Association, and the publication is hereinafter referred to as the "InfiniBand standard". The InfiniBand standard provides further descriptions for formats associated with datagrams, subnets, and other entities of a packet switched network. The InfiniBand standard defines a format for management messages which supports common processing, where the management messages are referred to as management datagrams (MAD). Each management datagram contains the same header format that identifies the class of a management message and the method. In the InfiniBand standard, the management datagrams used for administration of a subnet are described. Subnet administration uses particular formats for management datagrams, and such management datagrams are referred to as subnet administration management datagrams.

*InfiniBand is a registered trademark of the InfiniBand Trade Association.

SUMMARY OF THE PREFERRED EMBODIMENTS

Provided are a method, a system, and a computer program product in which a plurality of nodes are maintained in a switchless network, wherein each of the plurality of nodes has at least one host channel adapter for communication. A management datagram that indicates source to destination routes for communication in the plurality of nodes is provided. An attribute is configured in the management datagram to allow the management datagram to be propagated among the plurality of nodes of the switchless network without being terminated at host channel adapters.

In further embodiments, the host channel adapters terminate the management datagram at the host channel adapters if the attribute is not configured.

In additional embodiments, a payload of the attribute includes at least a direct route, a number of hops, and a hop counter.

In yet further embodiments, in response to receiving the attribute the hop counter is incremented by one.

In certain embodiments, sending of a reply to the attribute is performed by at least embedding the attribute, attribute parameters, reversed path information, and number of hops, and setting the hop counter to 0.

In additional embodiments, the attribute in the management datagram that allows the management datagram to be propagated among the plurality of nodes of the switchless network without being terminated at the host channel adapters is associated with subnet administration.

In further embodiments, the management datagram associated with the subnet administration is for an InfiniBand network.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The discovery and configuration of InfiniBand networks may be performed by using subnet manager protocol (SMP) direct routed management datagrams (MAD) that specify source to destination routes, and further details may be found in Chapter 15 ("Subnet Administration") of the publication "InfiniBand Architecture, Specification Volume 1, Release 1.3", published Mar. 3, 2015 by the InfiniBand Trade Association. In current InfiniBand networks, the transmission of such management datagrams may be terminated at host channel adapters (HCA) in a switchless network, and as a result the management datagrams cannot be propagated from node to node. In switched networks, the switches manage and forward the management datagrams which allows the transmission of such management datagrams between any pair of ports in the network.

Certain embodiments describe a method, system, and computer program for configuring an attribute for propagating management datagrams in a switchless network that may comprise an InfiniBand network. In such embodiments the transmission of the management datagrams is not terminated at host channel adapters.

Exemplary Embodiments

Figure 1:
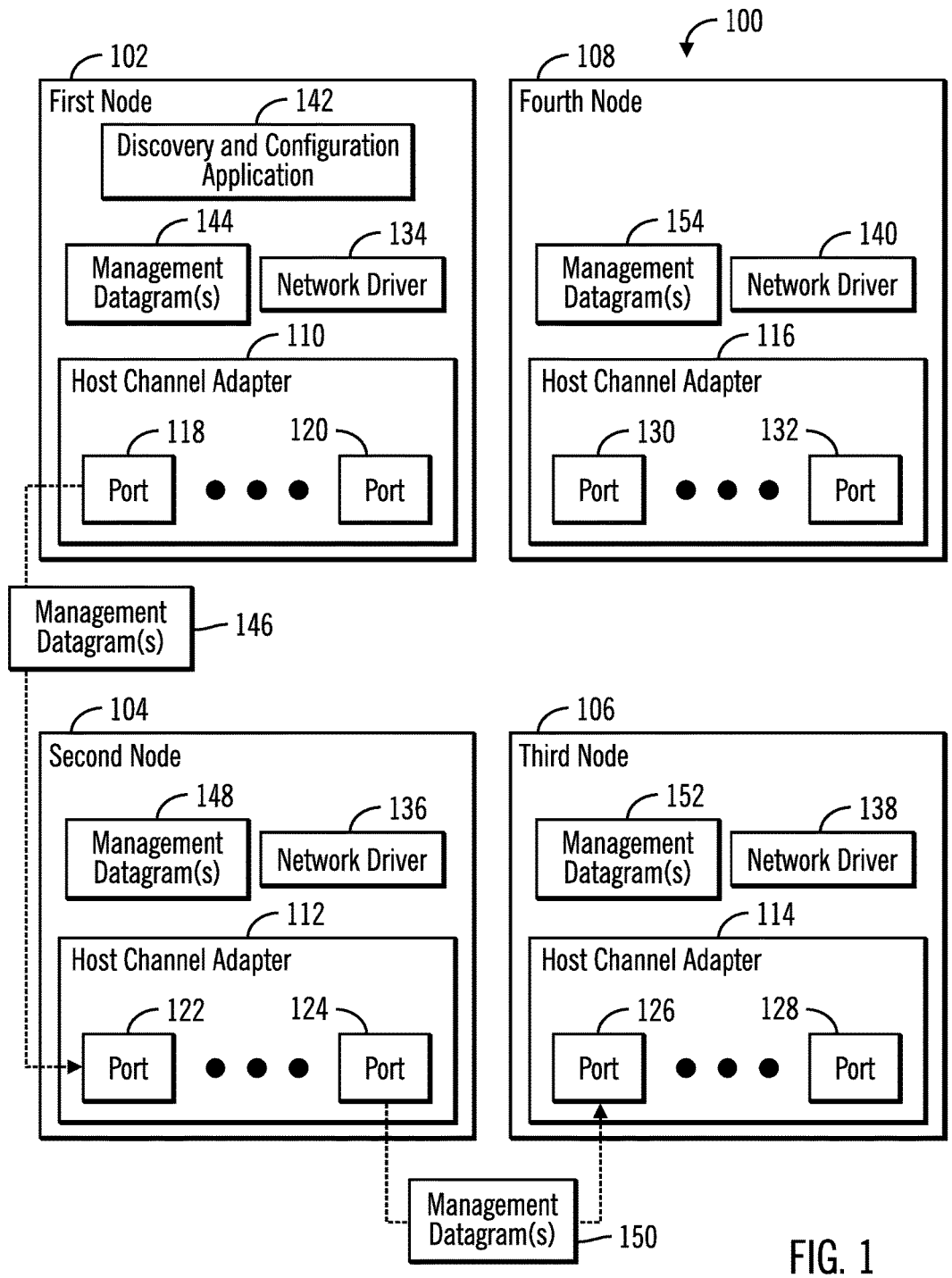
FIG. 1 illustrates a block diagram of a computing environment comprising a plurality of nodes coupled in a switchless network, in accordance with certain embodiments.

FIG. 1 illustrates a block diagram of a computing environment 100 comprising a plurality of nodes 102, 104, 106, 108 that are coupled in a switchless network, in accordance with certain embodiments. While in FIG. 1 only four nodes 102, 104, 106, 108 are shown, in alternative embodiments there may be a fewer or a greater number of nodes.

Each node may comprise any suitable computational device including those presently known in the art, such as, a personal computer, a workstation, a server, a mainframe, a hand held computer, a palm top computer, a telephony device, a network appliance, a blade computer, a processing device, a controller, etc. The nodes may be elements in any suitable network that is switchless. The switchless network is a network that does not rely on switches to direct or transmit packets. In certain embodiments, the nodes 102, 104, 106, 108 may be elements in a cloud computing environment.

The plurality of nodes 102, 104, 106, 108 may each include a host channel adapter (HCA) that may in certain embodiments comprise a peripheral component interconnect (PCI) card. The host channel adapter is hardware that allows packets to be received and transmitted in the switchless network. In FIG. 1, four representative host channel adapters 110, 112, 114, 116 are shown. The host channel adapters 110, 112, 114, 116 may include a plurality of ports, such as ports 118, 120, 122, 124, 126, 128, 130, 132. In FIG. 1, port 118 is shown in communication with port 122, and port 124 is shown in communication with port 126. In certain embodiments, the communication between any two ports is controlled via software implemented network drivers 134, 136, 138, 140, and other software implemented applications such as the discovery and configuration application 142 in the computing environment 100. The network drivers 134, 136, 138, 140 may interface with the host channel adapters 110, 112, 114, 116.

Managements datagrams 144, 146, 148, 150, 152, 154 may be used to transmit data from node to note in the switchless network of the computing environment 100. The control, configuration, and management of the management datagrams 144, 146, 148, 150, 152, 154 may be performed by at least the network drivers 134, 136, 138, 140 and the discovery and configuration application 142. While only one discovery and configuration application 142 has been shown in the first node 102, other nodes may also have similar applications.

In FIG. 1, the discovery and configuration application 142 in coordination with the network driver 134 configures the management datagram 144 for sending via port 118 of the host channel adapter 110. The management datagram 146 (corresponding to management datagram 144) is shown being transmitted from port 118 of the host channel adapter 110 of the first node 102, to port 122 of the host channel adapter 112 of the second node 104. Similarly management datagram 150 may be sent from the second node 104 to the third node 108. In certain embodiments, attributes in the management datagrams are configured such that a management datagram may be transmitted across a plurality of nodes, without the transmission being terminated on receipt of the management datagram by a host channel adapter of a receiving node.

Figure 2:
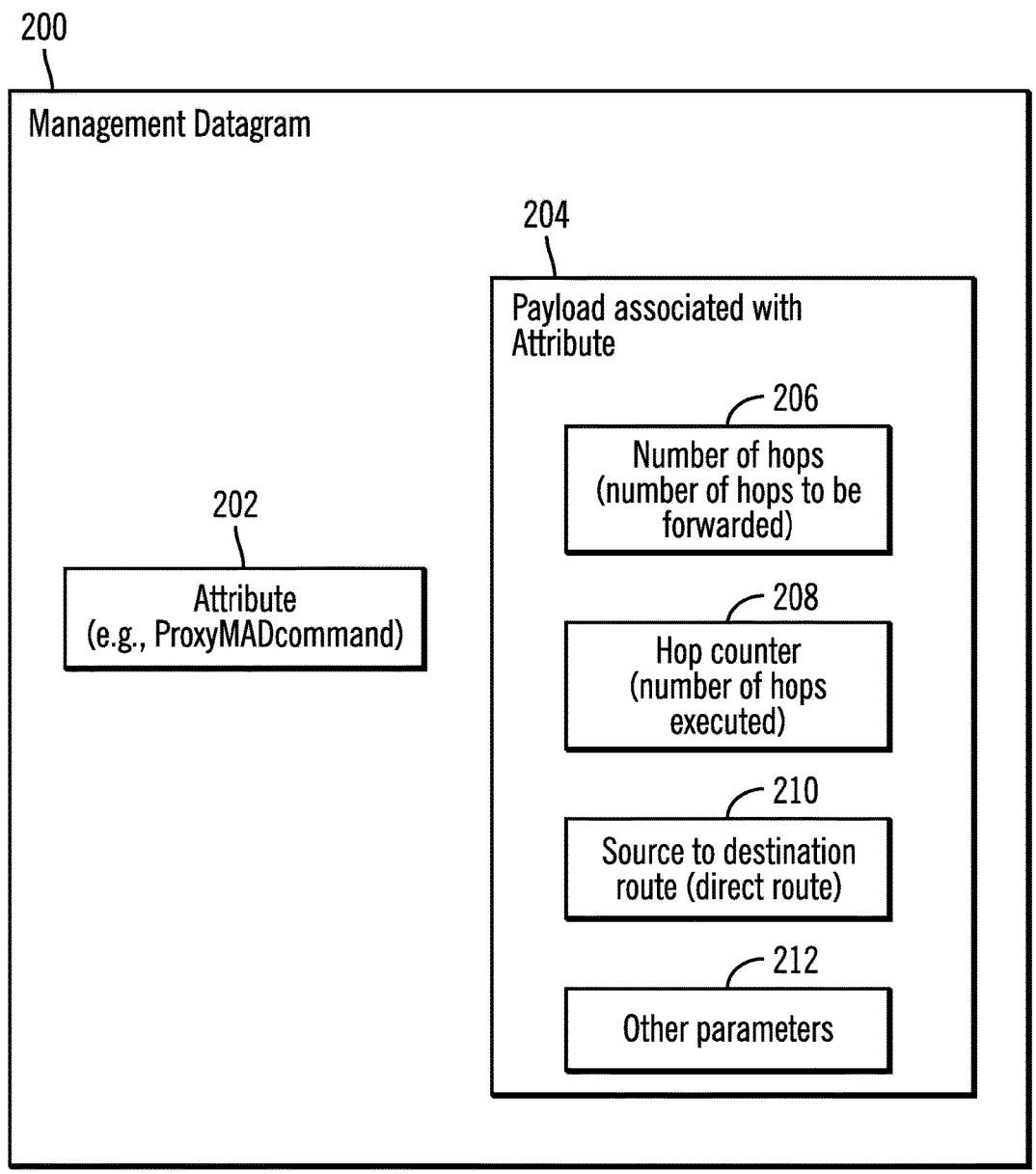
FIG. 2 illustrates a block diagram of a management datagram, in accordance with certain embodiments.

FIG. 2 illustrates a block diagram of a management datagram 200, in accordance with certain embodiments. In certain embodiments, each management datagram is configured to include an attribute 202 that may also be referred to as a ProxyMADcommand attribute. In certain embodiments, the ProxyMADcommand attribute is configured to allow management datagrams to continue transmission across the host channel adapter of a receiving node.

In certain embodiments, to implement the ProxyMADcommand attribute, a custom modifier of an existing attribute (already delivered to applications in the nodes 102, 104, 106, 108) may be used. In other embodiments the ProxyMADcommand attribute is implemented by marking an attribute such that it is processed by the host channel adapters and the marked attribute is delivered to the application 142 that is performing discovery and configuration.

Associated with the attribute 202 are payloads 204 for the management datagram 200. The payload 204 may include indicators and/or data structures corresponding to the number of hops 206, a hop counter 210, a source to destination route 210 that may comprise a direct route, and other parameters 212.

The number of hops 206 indicates the number of hops the management datagram is to be forwarded in the switchless network. The hop counter 208 indicates the number of hops executed, i.e., number of hops already forwarded. The source to destination route 210 indicates a direct route for management datagrams among nodes.

Figure 3:
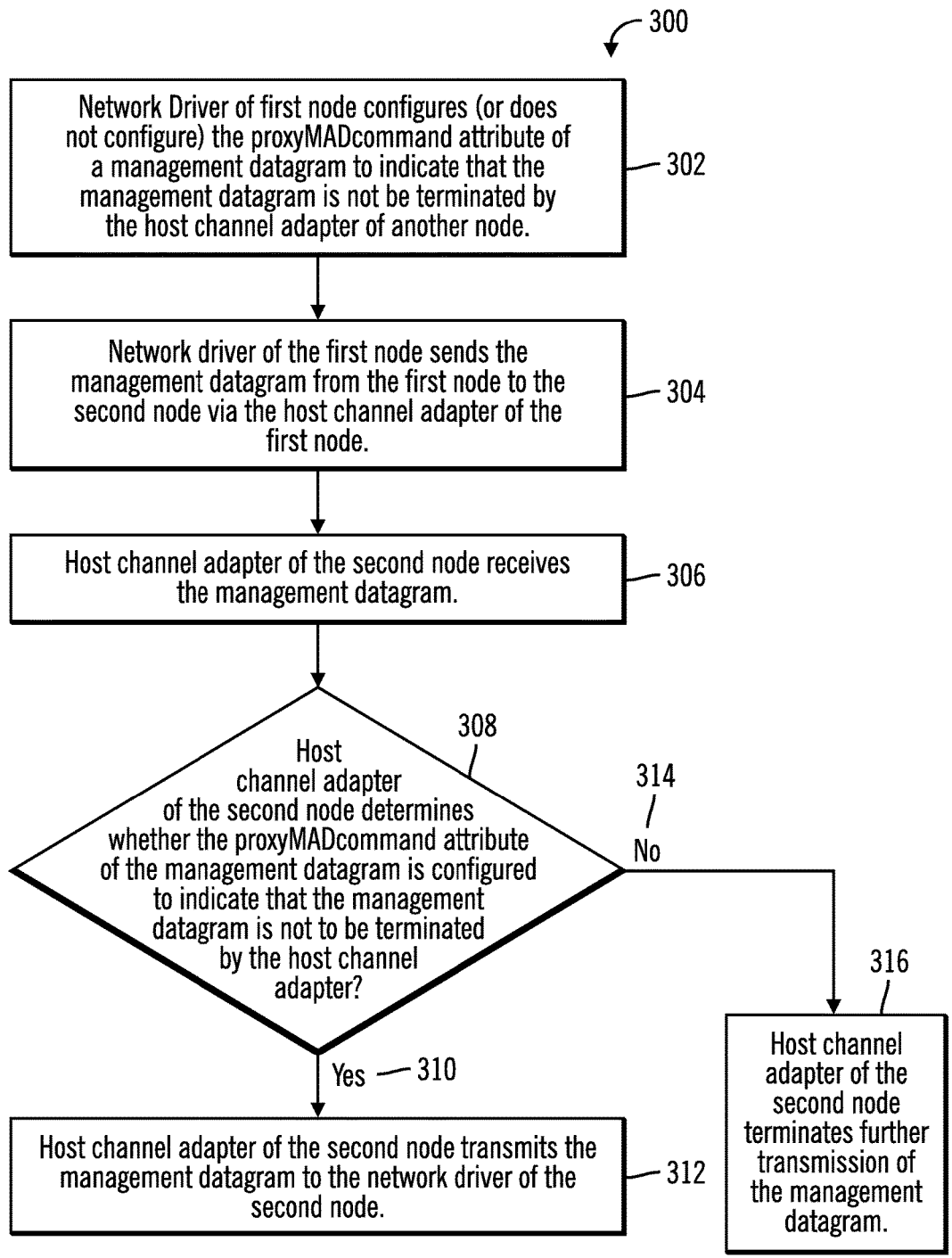
FIG. 3 illustrates a flowchart that shows the configuring of an attribute of a management datagram for transmission across a plurality of nodes in a switchless network, in accordance with certain embodiments.

FIG. 3 illustrates a flowchart 300 that shows the configuring of an attribute of a management datagram for transmission across a plurality of nodes in a switchless network, in accordance with certain embodiments.

Control starts at block 302 in which a network driver 134 of a first node 134 in cooperation with the discovery and configuration application 142 configures (or does not configure) the proxyMADcommand attribute of a management datagram 144 to indicate that the management datagram 144 is not be terminated by the host channel adapter of another node. Control proceeds to block 304 in which the network driver 134 of the first node 102 sends the management datagram 146 (corresponds to the management datagram 144) from the first node 102 to the second node 104 via the host channel adapter 110 of the first node 102.

The host channel adapter 112 of the second node 104 receives (at block 306) the management datagram 146. The host channel adapter 112 of the second node 104 determines (at block 308) whether the proxyMADcommand attribute of the management datagram 146 is configured to indicate that the management datagram 146 is not to be terminated by the host channel adapter. If so ("Yes" branch 310) control proceeds to block 312 in which the host channel adapter 112 of the second node 104 transmits the management datagram 146 to the network driver 136, where the network driver 136 may determine whether the management datagram 146 needs further retransmission to another node.

If at block 308, the host channel adapter 112 of the second node 104 determines that the proxyMADcommand attribute of the management datagram 146 is not configured to indicate that the management datagram is to not be terminated by the host channel adapter (as shown via "No" branch 314), control proceeds to block 316 in which the host channel adapter 112 of the second node 104 terminates further transmission of the management datagram 146, and the management datagram 146 is not forwarded to the network driver 136 of the second node 104.

Figure 4:
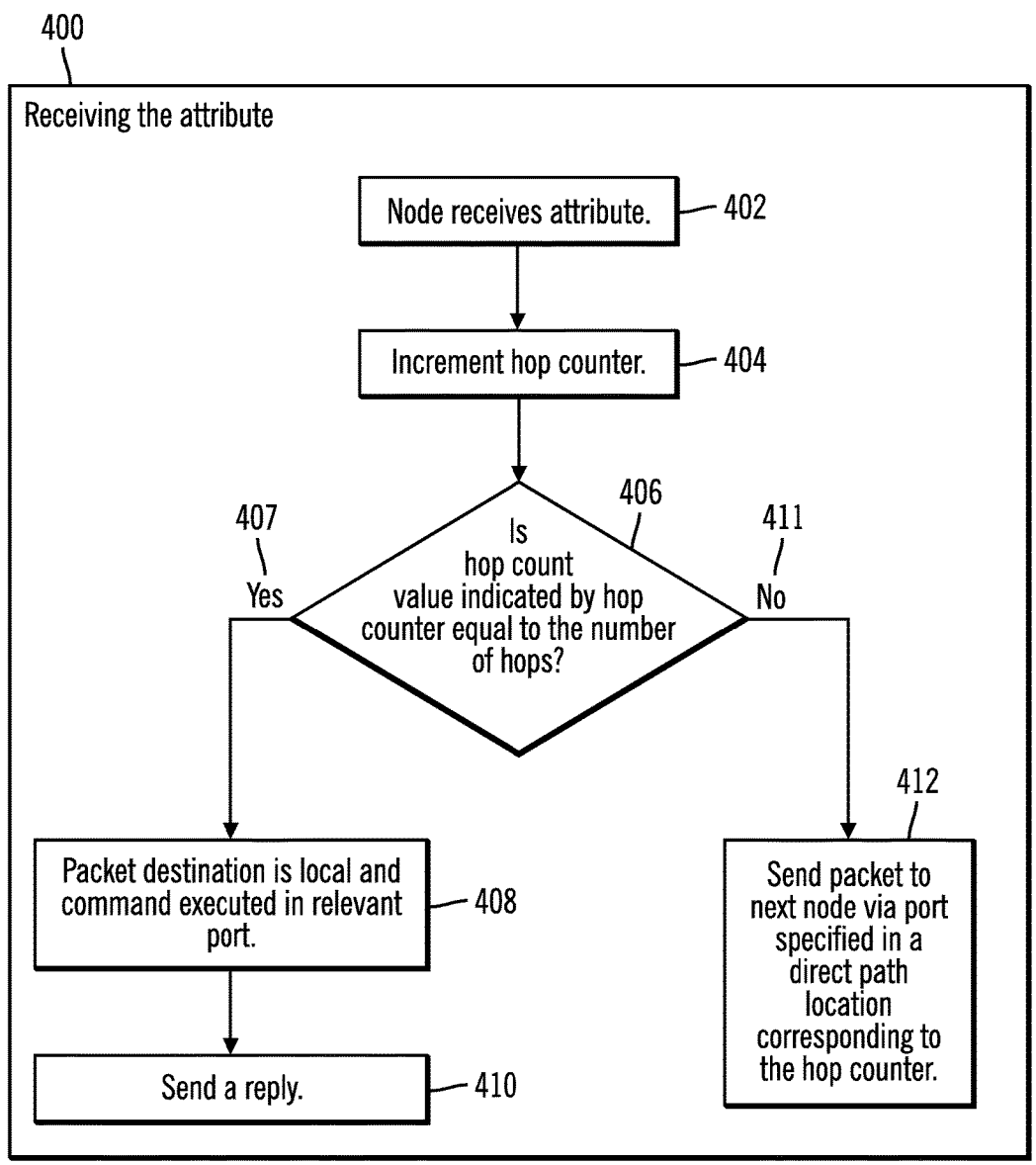
FIG. 4 illustrates a flowchart that shows operations performed on receiving an attribute of a management datagram in a switchless network, in accordance with certain embodiments.

FIG. 4 illustrates a flowchart 400 that shows operations performed on receiving an attribute of a management datagram in a switchless network, in accordance with certain embodiments.

Control starts at block 402 in which a node receives the attribute of a management datagram. The node increments (at block 404) the hop counter 208 to indicate that the management datagram and been transmitted another hop. Control proceeds to block 406 in which the node determines if the hop count value indicated by the hop counter is equal to the number of hops 206. If so ("Yes" branch 407), then the packet destination (i.e., the destination of the management datagram) is local to the node, and commands are executed in the local port of the node. Control proceeds to block 410 in which a reply is sent in response to the configuration of the ProxyMADcommand attribute. The sending of the reply is performed via the port specified at the first entry of a recorded path, and attributes, attribute parameters, reversed path information, and number of hops are embedded in the reply, while at the same time the hop counter has been set to zero.

If at block 406, it is determined that the hop count value indicated by the hop counter 208 is not equal to the number of hops ("No" branch 411) control proceeds to block 412 in which the packet (i.e., the management datagram) is transmitted to the next node via a port that is specified in a direct path location corresponding to the hop counter 208.

Figure 5:
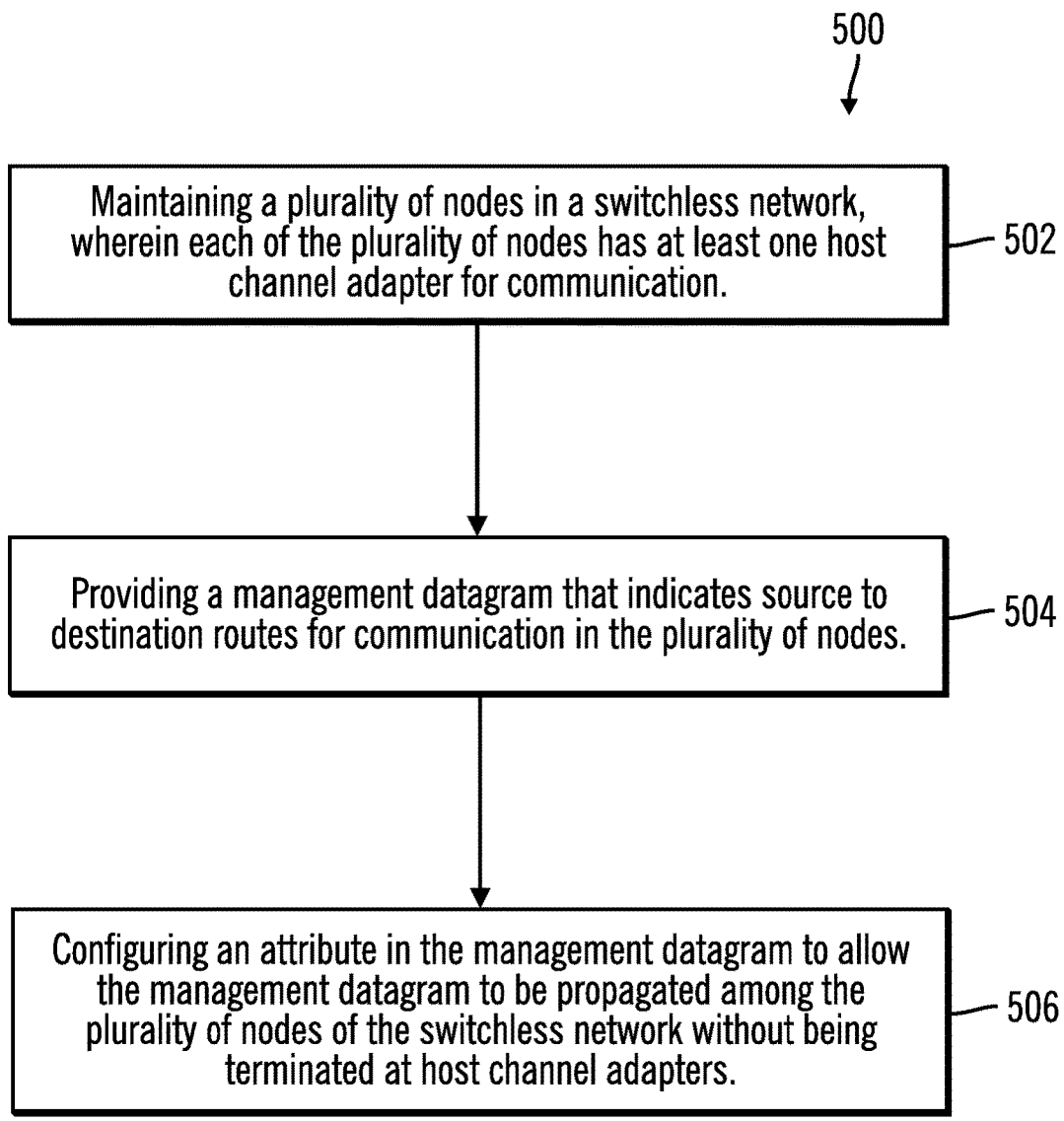
FIG. 5 illustrates a flowchart that shows the configuring of an attribute of a management datagram for transmission across a plurality of nodes in a switchless network, in accordance with certain embodiments.

FIG. 5 illustrates a flowchart 500 that shows the configuring of an attribute of a management datagram for transmission across a plurality of nodes in a switchless network, in accordance with certain embodiments.

Control starts at block 502 in which a plurality of nodes 102, 104, 106, 108 are maintained in a switchless network, wherein each of the plurality of nodes has at least one host channel adapter 110, 112, 114, 116 for communication. A management datagram that indicates source to destination routes for communication in the plurality of nodes is provided (at block 504). Control proceeds to block 506 in which, an attribute 202 is configured in the management datagram to allow the management datagram to be propagated among the plurality of nodes 102, 104, 106, 108 of the switchless network without being terminated at host channel adapters 110, 112, 114, 116. In further embodiments, the host channel adapters 110, 112, 114, 116 terminate the management datagram at the host channel adapters 110, 112, 114, 116 if the attribute is not configured.

In additional embodiments, the management datagram is associated with subnet administration for an InfiniBand network.

Therefore FIGS. 1-5 illustrate certain embodiments in which a new attribute is defined to allow transmission of management datagrams though host channel adapters in a switchless network that may be implemented in accordance with the InfiniBand standard.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
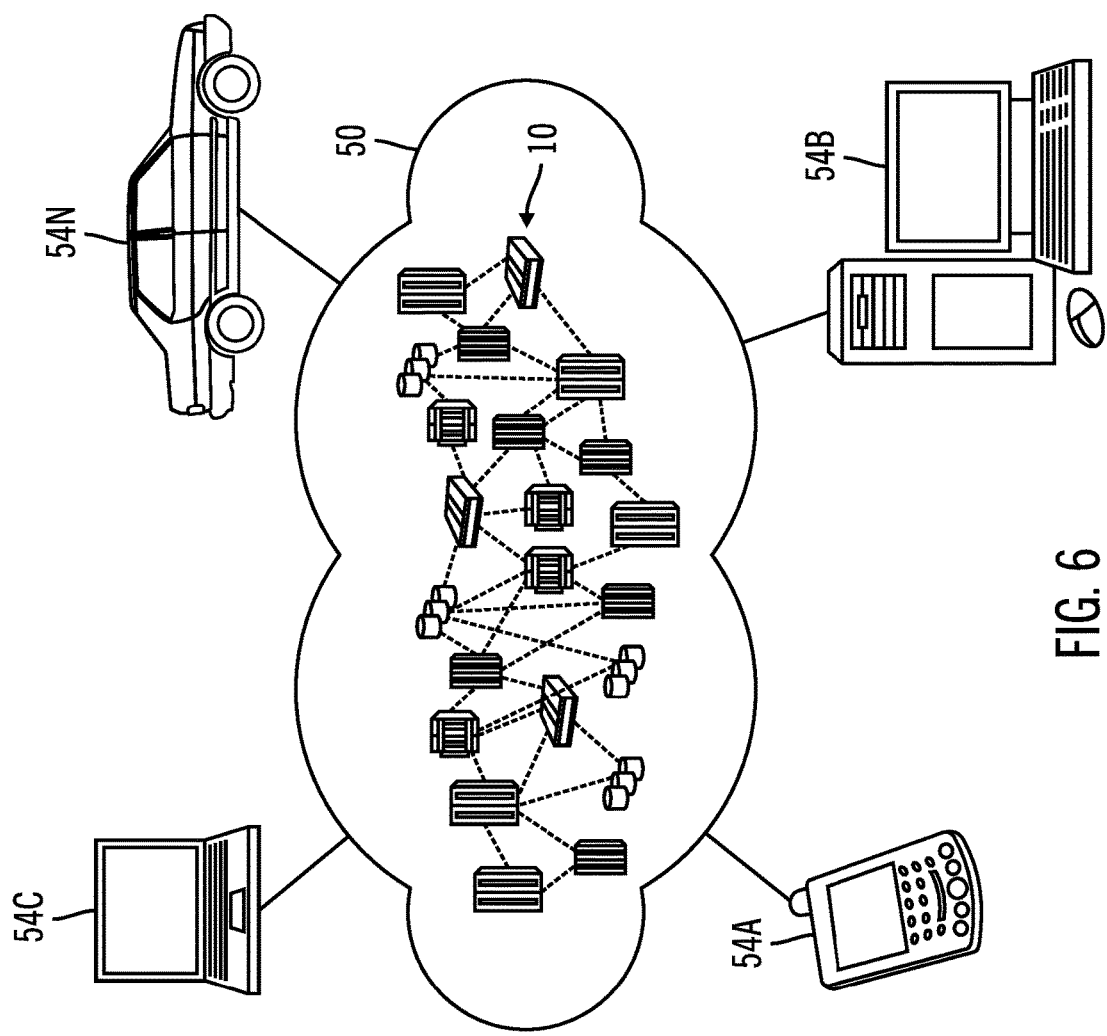
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
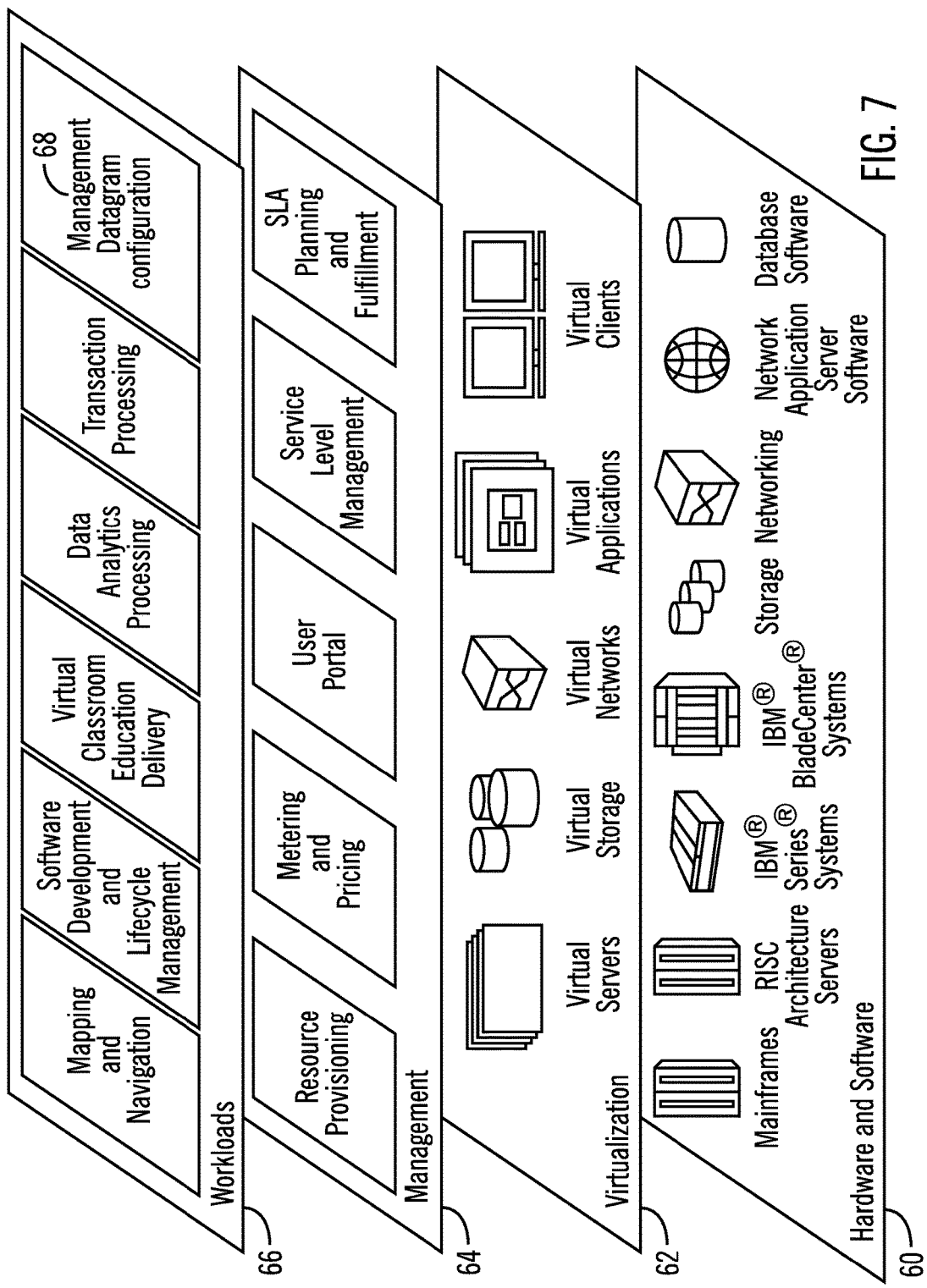
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 7) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the management datagram configuration 68 as shown in FIGS. 1-6.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
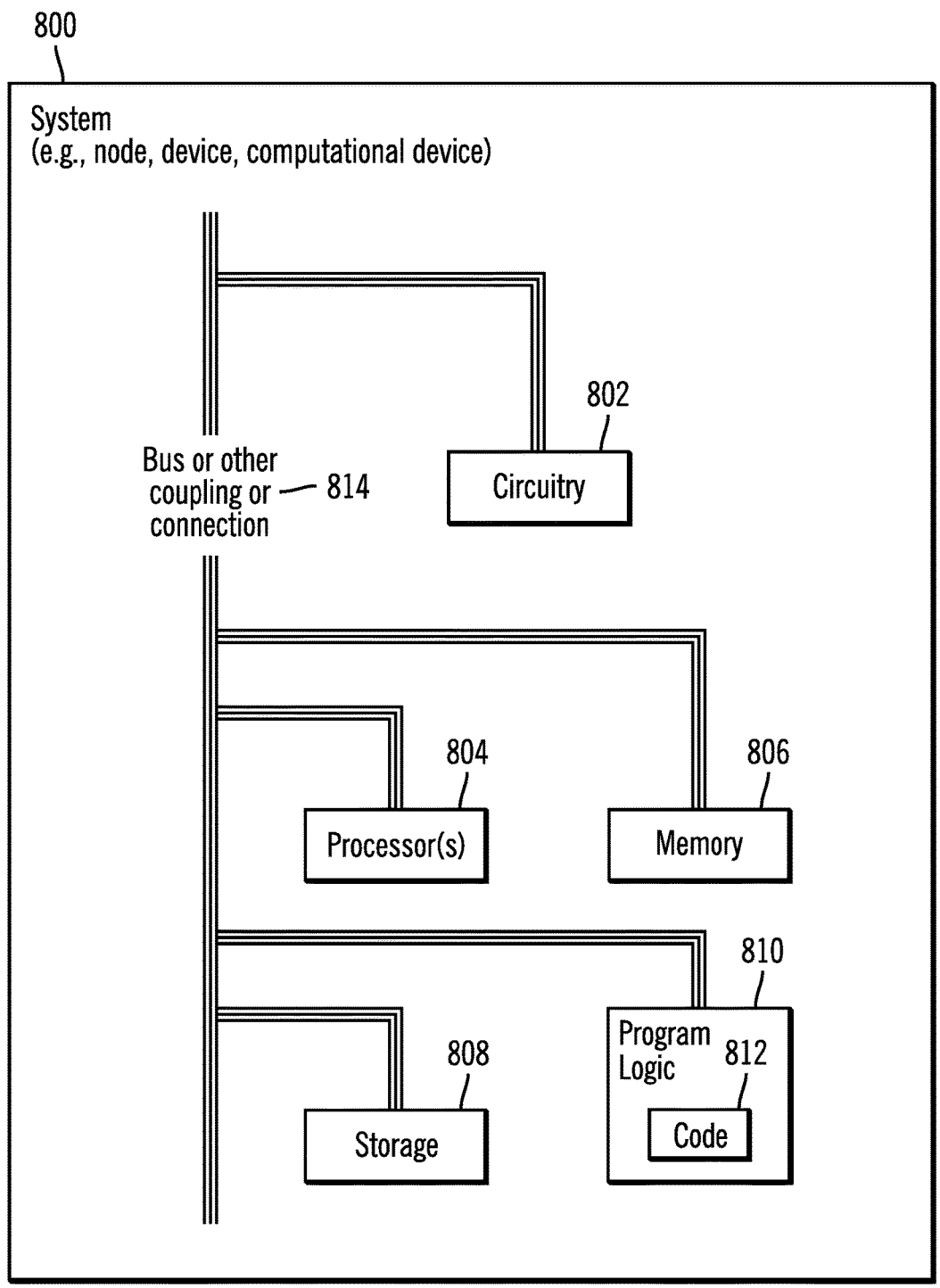
FIG. 8 illustrates a block diagram of a computational system that shows certain elements that may be included in one or more nodes, as described in FIGS. 1-7, in accordance with certain embodiments.

FIG. 8 illustrates a block diagram that shows certain elements that may be included in the nodes 102, 104, 106, 108 or other computational devices in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. One or more of the components in the system 800 may communicate via a bus or via other coupling or connection 814. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
maintaining a plurality of nodes in a switchless network, wherein each of the plurality of nodes has at least one host channel adapter for communication;
providing a management datagram that indicates source to destination routes for communication in the plurality of nodes; and
providing an attribute in the management datagram to allow the management datagram to be propagated among the plurality of nodes of the switchless network without being terminated at host channel adapters, wherein the method further comprises:
configuring, by a network driver of a first node, the attribute to indicate that transmission of the management datagram is not to be terminated by a host channel adapter of another node;
transmitting by the network driver of the first node, the management datagram from the first node to a second node via a host channel adapter of the first node;
determining, by a host channel adapter of the second node whether the attribute of the management datagram is configured to indicate that transmission of the management datagram is not to be terminated by the host channel adapter of the second node; and
in response to determining by the host channel adapter of the second node that the attribute of the management datagram is configured to indicate that transmission of the management datagram is not to be terminated by the host channel adapter of the second node, transmitting the management datagram to a network driver of the second node.

2. The method of claim 1, wherein a payload of the attribute includes at least a direct route, a number of hops, and a hop counter.

3. The method of claim 2, the method further comprising:
in response to receiving the attribute, incrementing the hop counter by one.

4. The method of claim 2, wherein sending of a reply to the attribute is performed by at least embedding the attribute, attribute parameters, reversed path information, and number of hops, and setting the hop counter to 0.

5. The method of claim 1, wherein the attribute in the management datagram that allows the management datagram to be propagated among the plurality of nodes of the switchless network without being terminated at the host channel adapters is associated with subnet administration.

6. The method of claim 5, wherein the management datagram associated with the subnet administration is for an InfiniBand network.

7. The method of claim 1, wherein the management datagram is a first management datagram, the method further comprising:
transmitting by the network driver of the first node, a second management datagram from the first node to the second node via the host channel adapter of the first node;
determining, by the host channel adapter of the second node whether an attribute of the second management datagram is configured to indicate that transmission of the second management datagram is not to be terminated by the host channel adapter of the second node;
in response to determining by the host channel adapter of the second node that the attribute of the second management datagram is not configured to indicate that transmission of the management datagram is not to be terminated by the host channel adapter of the second node, terminating by the host channel adapter of the second node, further transmission of the second management datagram.

8. A system in communication with a plurality of nodes in a switchless network, the system comprising:
a memory of a node; and
a processor of the node, the processor coupled to the memory, wherein the processor performs operations, the operations comprising:
maintaining a plurality of nodes in a switchless network, wherein each of the plurality of nodes has at least one host channel adapter for communication;
providing a management datagram that indicates source to destination routes for communication in the plurality of nodes; and
providing an attribute in the management datagram to allow the management datagram to be propagated among the plurality of nodes of the switchless network without being terminated at host channel adapters, wherein the operations further comprise:
configuring, by a network driver of a first node, the attribute to indicate that transmission of the management datagram is not to be terminated by a host channel adapter of another node;
transmitting by the network driver of the first node, the management datagram from the first node to a second node via a host channel adapter of the first node;
determining, by a host channel adapter of the second node whether the attribute of the management datagram is configured to indicate that transmission of the management datagram is not to be terminated by the host channel adapter of the second node; and
in response to determining by the host channel adapter of the second node that the attribute of the management datagram is configured to indicate that transmission of the management datagram is not to be terminated by the host channel adapter of the second node, transmitting the management datagram to a network driver of the second node.

9. The system of claim 8, wherein a payload of the attribute includes at least a direct route, a number of hops, and a hop counter.

10. The system of claim 9, the operations further comprising:
in response to receiving the attribute, incrementing the hop counter by one.

11. The system of claim 9, wherein sending of a reply to the attribute is performed by at least embedding the attribute, attribute parameters, reversed path information, and number of hops, and setting the hop counter to 0.

12. The system of claim 8, wherein the attribute in the management datagram that allows the management datagram to be propagated among the plurality of nodes of the switchless network without being terminated at the host channel adapters is associated with subnet administration.

13. The system of claim 12, wherein the management datagram associated with the subnet administration is for an InfiniBand network.

14. The system of claim 8, wherein the management datagram is a first management datagram, the operations further comprising:

transmitting by the network driver of the first node, a second management datagram from the first node to the second node via the host channel adapter of the first node;

determining, by the host channel adapter of the second node whether an attribute of the second management datagram is configured to indicate that transmission of the second management datagram is not to be terminated by the host channel adapter of the second node;

in response to determining by the host channel adapter of the second node that the attribute of the second management datagram is not configured to indicate that transmission of the management datagram is not to be terminated by the host channel adapter of the second node, terminating by the host channel adapter of the second node, further transmission of the second management datagram.

15. A computer program product, the computer program product comprising a computer readable storage medium having computer readable program code embodied therewith, the computer readable program code configured to perform operations, the operations comprising:

maintaining a plurality of nodes in a switchless network, wherein each of the plurality of nodes has at least one host channel adapter for communication;

providing a management datagram that indicates source to destination routes for communication in the plurality of nodes; and providing an attribute in the management datagram to allow the management datagram to be propagated among the plurality of nodes of the switchless network without being terminated at host channel adapters, wherein the operations further comprise:

configuring, by a network driver of a first node, the attribute to indicate that transmission of the management datagram is not to be terminated by a host channel adapter of another node;

transmitting by the network driver of the first node, the management datagram from the first node to a second node via a host channel adapter of the first node;

determining, by a host channel adapter of the second node whether the attribute of the management datagram is configured to indicate that transmission of the management datagram is not to be terminated by the host channel adapter of the second node; and in response to determining by the host channel adapter of the second node that the attribute of the management datagram is configured to indicate that transmission of the management datagram is not to be terminated by the host channel adapter of the second node, transmitting the management datagram to a network driver of the second node.

16. The computer program product of claim 15, wherein a payload of the attribute includes at least a direct route, a number of hops, and a hop counter.

17. The computer program product of claim 16, the operations further comprising:

in response to receiving the attribute, incrementing the hop counter by one.

18. The computer program product of claim 16, wherein sending of a reply to the attribute is performed by at least embedding the attribute, attribute parameters, reversed path information, and number of hops, and setting the hop counter to 0.

19. The computer program product of claim 15, wherein the attribute in the management datagram that allows the management datagram to be propagated among the plurality of nodes of the switchless network without being terminated at the host channel adapters is associated with subnet administration in an InfiniBand network.

20. The computer program product of claim 15, wherein the management datagram is a first management datagram, the operations further comprising:

transmitting by the network driver of the first node, a second management datagram from the first node to the second node via the host channel adapter of the first node;

determining, by the host channel adapter of the second node whether an attribute of the second management datagram is configured to indicate that transmission of the second management datagram is not to be terminated by the host channel adapter of the second node;

in response to determining by the host channel adapter of the second node that the attribute of the second management datagram is not configured to indicate that transmission of the management datagram is not to be terminated by the host channel adapter of the second node, terminating by the host channel adapter of the second node, further transmission of the second management datagram.

* * * * *